April 2, 1929.  J. B. HENDERSON  1,707,475
GYROSCOPIC APPARATUS
Filed May 19, 1920

Inventor
James B. Henderson
By Mosley & Gill
Attorneys

Patented Apr. 2, 1929.

1,707,475

UNITED STATES PATENT OFFICE.

JAMES BLACKLOCK HENDERSON, OF LEE, ENGLAND.

GYROSCOPIC APPARATUS.

Application filed May 19, 1920, Serial No. 382,676, and in Great Britain October 22, 1917.

(GRANTED UNDER THE PROVISIONS OF THE ACT OF MARCH 3, 1921, 41 STAT. L., 1313.)

This invention relates to gyroscopic apparatus and more particularly to an instrument which may be called an azimuth indicator and which has the general characteristic that a condition of balance is created in which the rate of tilt of the rotor axis of the gyroscope due to the earth's rotation is exactly balanced by an equal and opposite precession due to torques. This condition, which may be called a steady state, is independent of azimuth and therefore may be produced in any azimuth by a torque about only the vertical axis of the gyroscope. This torque is not a damping torque since there may be no precession in azimuth to damp.

In my application for patent Serial Number 313,537 filed July 26, 1919, I have described an arrangement of compass in which the gyroscope after being set up arbitrarily precesses after a short interval into a position in which the axis deviates from the meridian but in which the tilt of the axis is simply proportional to that deviation and I have described a method of employing a level to measure the tilt and to indicate or compensate the deviation. When settled in this position the gyroscope may have no tendency to precess towards the meridian or alternatively I can arrange the control so that it does precess towards the meridian, the velocity of precession being simply proportional to the deviation. Thus it theoretically takes an infinite time to reach the meridian as in all aperiodic motion.

My method of carrying out the invention is illustrated in the following figures:—

Figure 3:
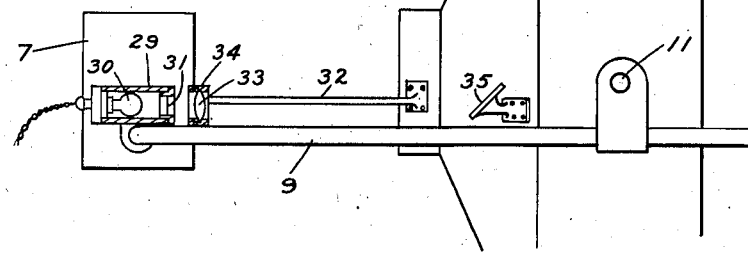
Fig. 3 is a diagram showing by way of comparison the paths traced out by the rotor axis of a periodic compass and that of the azimuth indicator of this invention.
Figure 3:
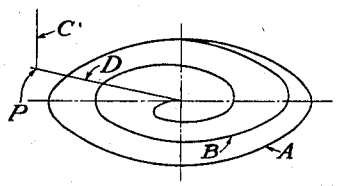

In the ordinary periodic gyro compass the rotor axis traces out on a plane perpendicular to the meridian an ellipse when the compass is disturbed, the vertical motion being produced by the rotation of the earth and the horizontal motion by the gravity control couple about the horizontal axis. This ellipse is shown as A in Fig. 3. The damping is produced by couples about the vertical axis causing the rotor axis to precess downwards when tilted upwards and vice versa, thus gradually reducing the dimensions of the ellipse. The damping curve is shown at B in Fig. 3.

I have found that if the gravity control couples about the horizontal axis are annulled leaving only the couples about the vertical the rotor axis precesses vertically downwards until the rate of precession downwards is equal to the rate of movement upwards due to the rotation of the earth and comes to rest at this point. The rate of motion upwards due to the rotation of the earth is proportional to the sine of the deviation of the rotor axis from the meridian and it follows therefore that the steady state in such a case is with the gyro rotor axis tilted at an angle proportional to the sine of the deviation. There is no tendency in such a case for the gyro to seek the meridian and its path is shown at C in Fig. 3 ending at the point P which represents the fixed position just referred to.

Figure 1:
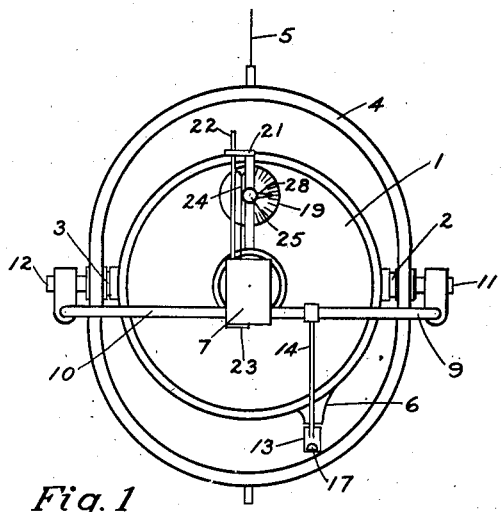
Figs. 1 and 2 are elevations viewed in the direction of the axis of the gyroscope and at right angles to each other, of one arrangement of the gyroscope and the level associated therewith.
Figure 2:
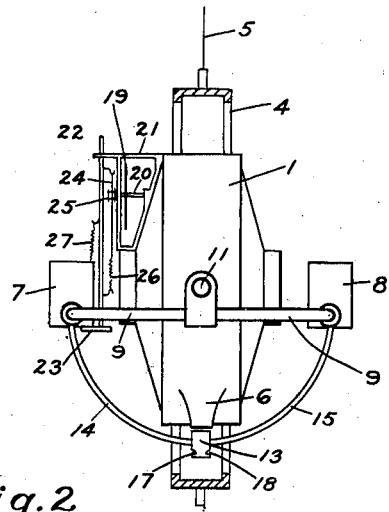

Referring now to Figs. 1 and 2, the gyroscope in its casing 1 is supported upon two horizontal trunnions 2 and 3 in a vertical gimbal ring 4 which is supported upon the suspension wire 5 in a manner well-known in the art. The gyro case 1 is fitted with an air nozzle 6 from which a jet of air emerges, produced by the rotation of the gyro rotor, the air entering the case through holes in the casing. The level consists of two cylindrical vessels 7 and 8 connected by two small bore tubes 9 and 10, the whole being supported pivotally on two small trunnions 11 and 12 coaxial with the trunnions 2 and 3. The level is constrained by a chute 13 which is fixed to it by a wire frame 14, 15, the air jet emerging from the nozzle 6 serving to constrain the level relatively to the gyro case in the manner described later. The level contains a viscous fluid, preferably oil, which half fills the vessels 7 and 8, the top of these vessels being open to atmospheric pressure. In its central position the level is in neutral equilibrium upon the trunnions 11, 12 and so long as the gyro axis remains horizontal the air jet keeps the level horizontal. If the gyroscope tilts, the air jet forces the level to tilt with it, the fluid then flows, say, from the vessel 7 to the vessel 8 and the level therefore tilts more than the gyroscope, the increased tilt being simply proportional to the tilt of the gyro axis. The tilt of the level relatively to the gyrocase is, therefore, a measure of the tilt of the gyro axis from the horizontal.

Since the level is pivoted on the trunnions 11 and 12 the forces on the chute 13, due to the air jet, which are holding up the weight of the fluid which has passed from the vessel 7 to vessel 8 can produce no couple on the gyroscope about the axis 11—12. There is thus no direct gravity control on the gyroscope. It might seem at first sight that the reaction to the gravity torque on the level must fall on the gyro, but this is not so. The reaction falls on the surrounding air and the gyro is only affected secondarily by eddy currents or the conservative system in the surrounding air is affected, which connects the jet with the inflow orifices in the gyro case. It may therefore be taken that in the form of gyroscope and level shown in Figs. 1 and 2 there is no gravity torque acting about the horizontal axis to produce precession in azimuth and that the only torque which can act on the gyro is the torque about the vertical axis caused by the air reactions on the chute being transferred to the gyroscope through the pivots of the level, the distribution between the two pivots being unequal on account of the eccentricity of the chute. The direction of the torque due to this unequal pressure depends on the formation and position of the chute.

Figure 4:
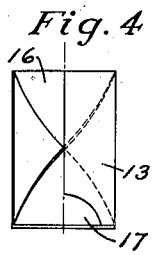
Fig. 4 is a detail view of the air chute used in the apparatus shown in Figs. 1 and 2.

One form of chute is shown in greater detail in Fig. 4, which is half in section. The chute consists of a cylindrical vessel 13 closed at the bottom and divided by a diaphragm 16 across the diameter. This diaphragm is twisted like a portion of a twist drill having half a turn of twist in the length of the chute 13. The chute is fitted with two apertures 17 and 18 at the bottom of the cylindrical walls (see Fig. 2) thus the air which enters the chute on the near side of the diaphragm 16 in Fig. 8 leaves the chute by the aperture 18 in the far side and vice versa. As the level tilts relatively to the gyroscope the two jets emerging from the apertures 17 and 18 become unequal, one gaining at the expense of the other, and the reaction of the stronger jet produces a force on the chute 13 which supports the weight of displaced fluid. This horizontal reaction on the chute 13 produces unequal horizontal pressures on the pivots 11 and 12, the pressure on 11 being greater than that on 12, thus a couple is produced on the gyroscope about the vertical central axis and the position of the chute and the direction of the rotation of the gyroscope are so arranged that this couple about the vertical introduces on the gyroscope a precession which will tend to annul the tilt of the gyroscope which has produced the unbalanced forces on the chute 13.

The gyroscope having been set up in any position with its rotor axis tilted arbitrarily, the air jet emerging from the nozzle 6 constrains the chute 13 and tilts the level 7, 8, 9. The fluid then flows from the vessel 7 say to the vessel 8, (see Fig. 2). The weight of the fluid gained by the vessel 8 tilts the level further than the gyro, until the air constraint on the chute 13 balances the increased weight. The tilt of the level relatively to the gyroscope is then proportional to the tilt of the gyro axis from the horizontal. The jet emerging from 18 is greater than that emerging from 17 and the differential reaction of the air jets has a moment about the vertical centre line since the apertures 17 and 18 are displaced from the vertical centre line of the gyroscope (see Fig. 1). This moment or torque is transmitted to the gyroscope through the trunnions 11 and 12 causing the rotor axis to precess above a horizontal axis so as to reduce the tilt. This precession continues until it is balanced by the upward motion of the rotor axis due to the rotation of the earth, the latter being proportional to the sine of the deviation of the rotor axis from the virtual meridian as has been already explained in connection with Fig. 3.

The tilt of the level relatively to the gyroscope being proportional to the tilt of the rotor axis is proportional to the sine of the deviation of the rotor axis from the virtual meridian and the level may therefore be used to indicate this deviation on a scale, as will now be described. In this form the gyroscope has no gravity control about the horizontal trunnions 11 and 12 and therefore does not seek the meridian.

I indicate the tilt of the level relatively to the gyro case which indicates the deviation of the gyroscope from the meridian or virtual meridian by any suitable means for measuring small angles. A simple mechanical method is shown in Figs. 1 and 2 in which a circular scale 19 is attached to a spindle 20 which is pivoted parallel to the rotor axis in a bracket 21 attached to the gyro case. A light rod 22 has its lower end resting in a hole or cup in a bracket 23 attached to the bottom of the vessel 7 of the level and its upper end is guided in a loose-fitting hole in the bracket 21. A thin cord 24 is attached to a hook near the top of the rod 22, then passes round a barrel or bobbin 25 on the spindle 20 and is then attached by means of a spring 26 to another hook near the bottom of the rod 22. The rod 22 is kept on its lower seating by a second spring 27 connecting the rod to any convenient part of the level. The vertical motion of the rod 22 as the level tilts relatively to the gyroscope turns the dial 19 and the position of the level is then indicated by the reading of the scale against a pointer 28 attached to the gyro case or bracket 21. Since the tilt of the level is proportional to the sine of the deviation, the dial 19 is graduated in sines and will indicate either the true deviation or its supplement. If the tilt is seen to be increasing the scale reading gives the supplement of the deviation, while if the tilt is decreasing the deviation itself is indicated.

Figure 5:
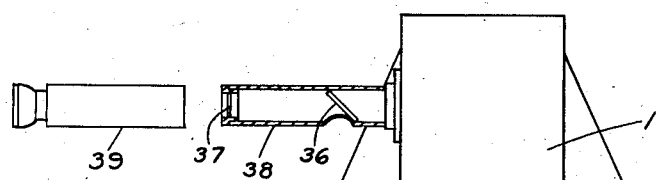
Fig. 5 shows a modified form of device for indicating the tilt of the gyroscope.

Another method which may be used and which is preferable as it gives a considerably magnified indication of the tilt and a more accurate reading is illustrated in Fig. 5. This consists of an optical lever mechanism which is a modification of that described and illustrated in my co-pending application Serial No. 313,540 filed July 26, 1919. I attach to the level a cell or tube 29 containing a small electric lamp 30 and a graticule 31, the latter being preferably a metal disc with a very narrow slit cut across its horizontal diameter. A bracket 32 attached to the gyro case supports a short focus lens 33 in a cell 34 in front of the graticule and at a distance from it slightly greater than the focal length of the lens. On the gyro case I mount a mirror 35 at 45° to the normal line of collimation to reflect the beam upwards into a second mirror 36 whose surface is at right angles to that of the mirror 35. This second mirror reflects the beam parallel to its original direction on to a glass screen 37 on which is engraved a vertical scale on which the image of the graticule 31 is focussed by the lens 33. The graduations of the scale corresponding with a given angle of tilt of the level, can be calculated from the focal length of the lens and the total optical length from the graticule to the screen. The mirror 36 and screen 37 may be mounted in a tube 38 as shown. The lamp can be illuminated from the same source as supplies current to drive the gyro rotor, but since the exact position of the lamp is unimportant so long as it illuminates the graticule, it is unnecessary to mount the lamp on the level and a small electric torch held in the hand of the observer when making a reading will serve the purpose quite well and obviate the necessity for electrical leads on the gyro or level.

Any tilt of the level relatively to the gyro deflects the lens 33 relatively to the graticule 31 in the vertical plane and the image of the graticule thrown on the screen 37 will be defletced up or down the scale, giving a considerably magnified reading of the relative tilt. Further magnification can be obtained by mounting the second mirror 36 on the level instead of on the gyro case, and also by observing the scale reading through an eyepiece or microscope 39, which may either be held in the hand or attached to a follow-up element of the gyroscope. Various alternative arrangements of this optical mechanism are possible to increase the magnification or to deflect the beam in different directions without departing from the simple underlying principle of the mechanism described.

I claim:

1. An azimuth indicator comprising a gyroscope, a control for said gyroscope for causing it to assume a tilt from the horizontal plane proportional to its deviation from the meridian, and means for measuring said tilt to determine the deviation of the gyroscope from the meridian.

2. In a gyroscopic instrument, a gyroscope supported upon a substantially horizontal axis, a level pivotally mounted upon an axis coinciding with the horizontal axis, and means connected to the level and adapted to be actuated by the rotation of the gyroscope for tilting the level relatively to the gyroscope upon movement of the gyroscope about the horizontal axis.

3. In a gyroscopic instrument, a gyroscope supported upon a substantially horizontal axis, a level pivotally mounted with respect to the gyroscope and means connected to the level and adapted to be actuated by the rotation of the gyroscope for tilting the level relatively to the gyroscope upon the movement of the gyroscope about the horizontal axis.

4. A gyroscopic instrument comprising a gyroscopic element having an ultimate stable position of its rotor axis relatively to the earth, means associated with the gyroscopic element for causing its rotor axis to trace a substantially straight line path in a plane perpendicular to the ultimate stable position of the axis when displaced therefrom and means for measuring the tilt of the gyroscopic element during its movement to determine its deviation from its ultimate stable position.

5. A gyroscopic instrument comprising a universally mounted and neutrally balanced gyroscope and means to establish a steady state of the gyroscope, irrespective of azimuth, in which its rate of tilt due to the earth's rotation will be balanced by an equal and opposite precession of the gyroscope, said means comprising a torque-applying mechanism associated with the gyroscope and responsive to tilting of the rotor axis and adapted to apply to the gyroscope a controlling torque about the vertical axis of the gyroscope in proportion to said tilt.

6. A gyroscopic instrument comprising a universally mounted and neutrally balanced gyroscope and means to establish a steady state of the gyroscope independent of azimuth in which the tilt of the rotor axis is proportional to the sine of the deviation of the rotor axis from the meridian, said means comprising a torque-applying mechanism associated with the gyroscope and responsive to tilting of the rotor axis from the horizontal and adapted to apply to the gyroscope a controlling torque about the vertical axis of the gyroscope in proportion to said tilt.

7. A gyroscopic instrument comprising a universally mounted and neutrally balanced gyroscope having its rotor axis substantially horizontal and means to establish a steady state of the gyroscope, irrespective of azimuth, in which its rate of tilt due to the earth's rotation will be balanced by an equal and opposite precession of the gyroscope, said means comprising a torque-applying mechanism associated with the gyroscope and responsive to tilting of the rotor axis from the horizontal and adapted to apply to the gyroscope a controlling torque about the vertical axis of the gyroscope in proportion to said tilt.

8. A gyroscopic instrument comprising a universally mounted and neutrally balanced gyroscope having its rotor axis substantially horizontal and means to establish a steady state of the gyroscope independent of azimuth in which the tilt of the rotor axis from the horizontal is proportional to the sine of the deviation of the rotor axis from the meridian, said means comprising a torque-applying mechanism associated with the gyroscope and responsive to tilting of the rotor axis from the horizontal and adapted to apply to the gyroscope a controlling torque about the vertical axis of the gyroscope in proportion to said tilt.

9. A gyroscopic instrument comprising a gyroscope supported upon a substantially horizontal axis, a liquid level device pivotally mounted with respect to the gyroscope, means connected to the device and adapted to be actuated by the rotation of the gyroscope for tilting the device relatively to the gyroscope upon the movement of the gyroscope about the horizontal axis, and means for indicating the tilt of the device relatively to the gyroscope comprising coacting elements attached to the device and the gyroscope.

10. An azimuth indicator comprising a gyroscope, a torque applying mechanism comprising a part movable relatively to the gyroscope and means coacting with the part actuated by rotation of the gyroscope about its spinning axis and responsive to tilting of the rotor axis for applying a torque about the vertical axis of the gyroscope in proportion to the tilt of the rotor axis.

JAMES BLACKLOCK HENDERSON.